UNITED STATES PATENT OFFICE.

JAMES DONOVAN MALCOLMSON, OF WILKINSBURG, PENNSYLVANIA, ASSIGNOR, BY MESNE ASSIGNMENTS, TO THE CONTAINER CLUB, OF CHICAGO, ILLINOIS, A CORPORATION OF DELAWARE.

MANUFACTURE OF ADHESIVES.

1,379,639.  Specification of Letters Patent.  Patented May 31, 1921.

No Drawing.  Application filed March 14, 1918. Serial No. 222,415.

*To all whom it may concern:*

Be it known that I, JAMES DONOVAN MALCOLMSON, a citizen of the United States, residing at No. 199 Meade street, Wilkinsburg, in the county of Allegheny, State of Pennsylvania, have invented certain new and useful Improvements in the Manufacture of Adhesives; and I do hereby declare the following to be a full, clear, and exact description of the invention, such as will enable others skilled in the art to which it appertains to make and use the same.

Commercial silicate of soda (water glass) is largely used in the art as an adhesive, as, for instance, in the paper board industry and particularly in the production of so-called corrugated board, and the like. For this, and similar purposes, commercial silicate of soda possesses physical properties, which particularly adapt it to successful use, such as the requisite adhesive power, viscosity, speed of drying, degree of penetration (absorption), and flexibility when dry. It is in large demand, and is used in a great many manufacturing establishments throughout the country, so that the obtaining of the necessary supply and the question of transportation and the freight rates thereon, are of material importance to the arts in which it is used.

The present invention is based upon the discovery that the volume of commercial silicate of soda can be materially increased, at a comparatively small expense, without sacrificing any of the original physical properties which make it of value as an adhesive; and even with the enhancing of certain of those properties, if, in any instance, it is considered appropriate to do so. The material to be added to the water glass, for the purpose of increasing its volume, is, moreover, readily obtainable and of relatively small cost, and the expense involved in incorporating it in the water glass is moderate,—the apparatus appropriate for the purpose being simple and economical in construction and operation.

Commercial silicate of soda or water glass consists mainly of hydrated silicate of sodium and hydrated silica, the latter being present in the mixture in a colloidal state. I have ascertained that if there is added to the water glass a brine solution made up by dissolving common salt (sodium chlorid) in water and of a sufficient concentration, the water glass will tolerate a relatively large quantity of the added brine without losing its original properties. The brine should be added to the water glass slowly and, at the same time, the water glass should be constantly stirred, so as to prevent the settling of the resultant gelatinous silica, which would otherwise accumulate and coalesce at the bottom of the receptacle in a jelly-like layer. A further function of the stirring, is, moreover, to assist in the reversion to the colloidal state, of the lumps or clots of the jelly-like silica referred to. The result is that after the necessary period of time has elapsed, the lumps or clots disappear, and the product is of an increased volume corresponding to the amount of brine added. The solution can be diluted with 20% or more of brine, and the resultant viscosity will nevertheless be equal to or even greater than that of the original water glass.

The most satisfactory results have been obtained by the addition of 20% by volume of brine containing from 20 to 21% by weight of salt.

It is a characteristic of the invention that the viscosities, at the point nearest the original viscosity of the water glass, can be controlled very accurately by a very small change in the concentration of the added brine. This permits a manufacturer to determine what particular viscosity he desires and to then obtain a viscosity equal to that of the original water glass, or considerably above or below that figure, by an exceedingly small change in the amount of salt used, and while still preserving the other qualities of the adhesive practically unchanged. Furthermore, this concentration can be accurately controlled with a hydrometer, since at these concentrations, the hydrometer is very sensitive to even small changes in the amount of salt present in the brine.

It will be found that when 20% by volume of brine is added to the water glass, a viscosity somewhat in excess of the normal can be obtained by having the concentration at 21%, and that the viscosity can be lowered to and below the normal by decreasing the concentration from that percentage downwardly. Usually, it will not be desirable to decrease the concentration materially, if at all, below 20% for the reason that at lower degrees of concentration there is, in part, a sacrifice of the adhesive properties of the product.

In making up the brine, it will suffice to merely add the correct weight of crude salt to the appropriate amount of water. The specific gravty is then checked with an ordinary hydrometer, of the heavier than water style, reading from 0° to 25° Baumé, which will show very accurately the amount of salt in solution, if the solution has been well stirred.

It will be understood that instead of making up the brine from sodium chlorid, an equivalent therefor may be employed, such as chlorid of potassium or a chlorid of the alkaline earth metals; but, in general, it will not be advisable to use a substitute for chlorid of sodium for the reason that it fully subserves the intended function and is not only readily obtainable, but is, in most cases, the cheapest salt available for the purpose. It is not even necessary that the sodium chlorid should be in a pure state, inasmuch as crude common salt can be used to advantage, the contained impurities merely settling to the bottom.

Having thus described my invention, what I claim is:

1. The method of increasing the volume of water glass without impairing its adhesive properties, which comprises adding brine to the water glass, and redissolving in the water glass the silica coagulated by the addition of brine; substantially as described.

2. The method of increasing the volume of water glass without impairing its adhesive properties, which comprises adding brine to the water glass, and re-dissolving in the water glass the silica coagulated by the addition of brine, stirring being employed to prevent settling of the coagulated silica, and for assisting its re-dissolving; substantially as described.

3. An adhesive, consisting of water glass whose volume has been increased by the addition of brine, and in which the silica coagulated by the addition of the brine has been re-dissolved; substantially as described.

4. An adhesive, consisting of water glass whose volume has been increased by the addition of brine, and in which the silica coagulated by the addition of the brine has been re-dissolved, the quantity of brine added being approximately 20% by volume of the water glass and containing about 20 to 21% by weight of salt; substantially as described.

In testimony whereof I affix my signature.

JAMES DONOVAN MALCOLMSON.